Figure 1:
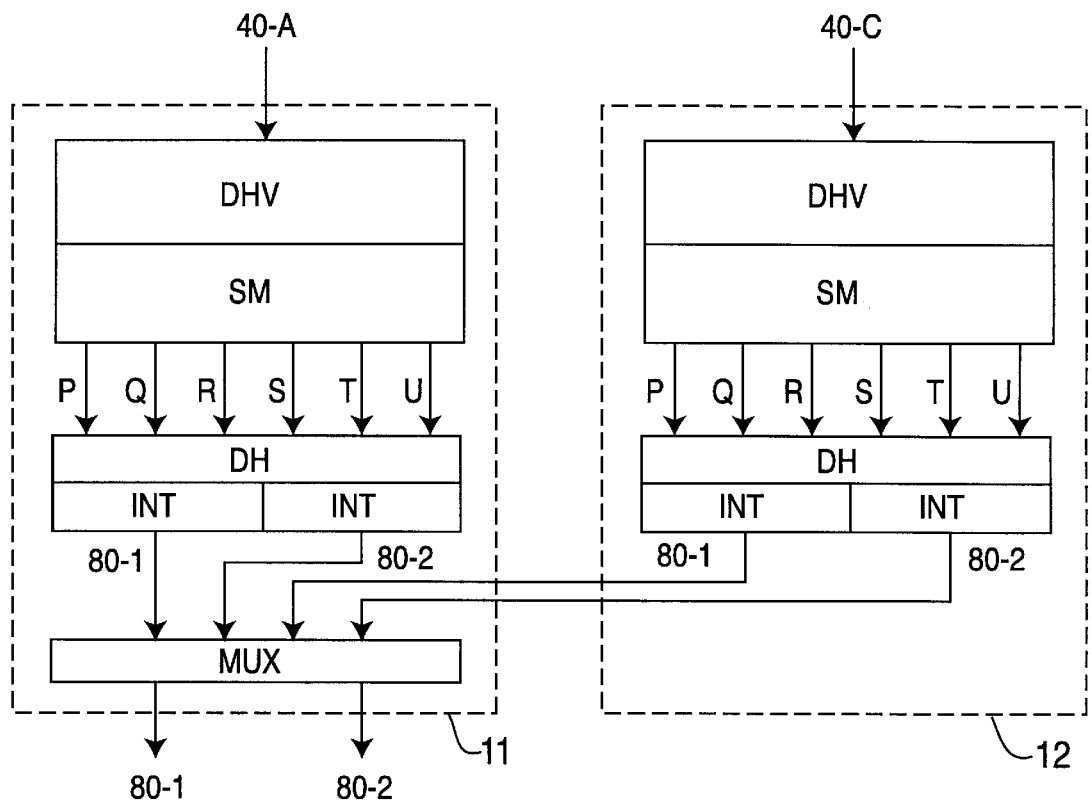

United States Patent [19]
Collet et al.

[11] Patent Number: 5,844,616
[45] Date of Patent: Dec. 1, 1998

[54] METHOD AND APPARATUS FOR MOTION COMPENSATED INTERPOLATION

[75] Inventors: Eric Collet, Illkirch; Michel Kerdranvat, Bischoffsheim, both of France

[73] Assignee: Thomson multimedia S.A., Courbevoie, France

[21] Appl. No.: 535,111

[22] PCT Filed: May 28, 1994

[86] PCT No.: PCT/EP94/01750

§ 371 Date: Mar. 27, 1996

§ 102(e) Date: Mar. 27, 1996

[87] PCT Pub. No.: WO94/28677

PCT Pub. Date: Dec. 8, 1994

[30] Foreign Application Priority Data

Jun. 1, 1993 [EP] European Pat. Off. .............. 93401393

[51] Int. Cl.⁶ .................................................. H04N 7/01
[52] U.S. Cl. ............................................ 348/441; 348/427
[58] Field of Search .................................. 348/427, 426, 348/441, 571, 445, 448, 699–701, 489; 382/107

[56] References Cited

U.S. PATENT DOCUMENTS

| | | | |
|---|---|---|---|
| 4,587,556 | 5/1986 | Collins | 358/140 |
| 4,654,876 | 3/1987 | Atkins | 382/120 |
| 5,070,403 | 12/1991 | Wilkinson | 348/441 |

FOREIGN PATENT DOCUMENTS

| | | |
|---|---|---|
| 0347325 | 12/1989 | European Pat. Off. . |
| 0424269 | 4/1991 | European Pat. Off. . |
| 0427576 | 5/1991 | European Pat. Off. . |
| 0428216 | 5/1991 | European Pat. Off. . |
| 91/12691 | 8/1991 | WIPO . |

*Primary Examiner*—Victor R. Kostak
*Attorney, Agent, or Firm*—Joseph S. Tripoli; Frederick A. Wein

[57] ABSTRACT

For motion compensated interpolation (MCI) with sub-pixel accuracy, the missing pixels need to be interpolated prior to the motion compensation. The required pixel values are stored using line and pixel delays. A switch matrix selects, in response to a motion vector, such stored pixels which are currently needed for the processing. In order to avoid sub-pixel MCI, the interpolation is carried out prior to the motion compensation. In order to avoid an increased input data rate of the motion compensation circuitry, only a standard switch matrix is used. A special arrangement of delays storing pixel values needed for the processing is used to extend the standard delay array. Because an increased number of pixels is involved, an improved sub-pixel MCI can be achieved. This is because such a delay extension does not significantly affect the decoded picture quality even if adjacent motion vectors do not exactly match the current motion vector.

9 Claims, 8 Drawing Sheets o: "80-1"
△: "80-2"

| Pv/Ph | 9 | 8 | 7 | 6 | 5 | 4 | 3 | 2 | 1 |
|---|---|---|---|---|---|---|---|---|---|
| 8 |   | X | X | X | X | X | X | X | X |
| 7 | X | X | X | X | X | X | X | X |   |
| 6 |   | X | X | X | X | X | X | X | X |
| 5 | X | X | X | X | @ | X | X | X |   |
|   |   |   |   |   | O |   |   |   |   |
| 4 |   | X | X | X | X | X | X | X | X |
| 3 | X | X | X | X | X | X | X | X |   |
| 2 |   | X | X | X | X | X | X | X | X |
| 1 | X | X | X | X | X | X | X | X |   |

FIG. 9a

| Pv/Ph | 9 | 8 | 7 | 6 | 5 | 4 | 3 | 2 | 1 |
|---|---|---|---|---|---|---|---|---|---|
| 8 | X | X | X | X | X | X | X | X |   |
| 7 |   | X | X | X | X | X | X | X | X |
| 6 | X | X | X | X | X | X | X | X |   |
| 5 |   | X | X | X | @ | X | X | X | X |
|   |   |   |   |   | O |   |   |   |   |
| 4 | X | X | X | X | X | X | X | X |   |
| 3 |   | X | X | X | X | X | X | X | X |
| 2 | X | X | X | X | X | X | X | X |   |
| 1 |   | X | X | X | X | X | X | X | X |

FIG. 9b

| | | PV | | | | | |
|---|---|---|---|---|---|---|---|
| Vy | VXP | P | Q | R | S | T | U |
| 6 | ODD | 2 | 3 | 2 | 1 | 1 | X |
| 6 | EVEN | 2 | 3 | 2 | 1 | 1 | X |
| 5 | ODD | 3 | 4 | 3 | 2 | 2 | 1 |
| 5 | EVEN | 2 | 3 | 2 | 1 | 1 | X |
| 4 | ODD | 3 | 4 | 3 | 2 | 2 | 1 |
| 4 | EVEN | 3 | 4 | 3 | 2 | 2 | 1 |
| 3 | ODD | 3 | 4 | 3 | 2 | 2 | 1 |
| 3 | EVEN | 4 | 5 | 4 | 3 | 3 | 2 |
| 2 | ODD | 4 | 5 | 4 | 3 | 3 | 2 |
| 2 | EVEN | 4 | 5 | 4 | 3 | 3 | 2 |
| 1 | ODD | 5 | 6 | 5 | 4 | 4 | 3 |
| 1 | EVEN | 4 | 5 | 4 | 3 | 3 | 2 |
| 0 | ODD | 5 | 6 | 5 | 4 | 4 | 3 |
| 0 | EVEN | 5 | 6 | 5 | 4 | 4 | 3 |
| -1 | ODD | 5 | 6 | 5 | 4 | 4 | 3 |
| -1 | EVEN | 6 | 7 | 6 | 5 | 5 | 4 |
| -2 | ODD | 6 | 7 | 6 | 5 | 5 | 4 |
| -2 | EVEN | 6 | 7 | 6 | 5 | 5 | 4 |
| -3 | ODD | 7 | 8 | 7 | 6 | 6 | 5 |
| -3 | EVEN | 6 | 7 | 6 | 5 | 5 | 4 |
| -4 | ODD | 7 | 8 | 7 | 6 | 6 | 5 |
| -4 | EVEN | 7 | 8 | 7 | 6 | 6 | 5 |
| -5 | ODD | 7 | 8 | 7 | 6 | 6 | 5 |
| -5 | EVEN | 8 | X | 8 | 7 | 7 | 6 |
| -6 | ODD | 8 | X | 8 | 7 | 7 | 6 |
| -6 | EVEN | 8 | X | 8 | 7 | 7 | 6 |

FIG. 10a

| | | PH | | | | | |
|---|---|---|---|---|---|---|---|
| Vx | SP | P | Q | R | S | T | U |
| 6 | ODD | 9 | 8 | 8 | 8 | 7 | 8 |
| 6 | EVEN | 8 | 8 | 7 | 8 | 7 | 7 |
| 5 | ODD | 8 | 8 | 7 | 8 | 7 | 7 |
| 5 | EVEN | 8 | 7 | 7 | 7 | 6 | 7 |
| 4 | ODD | 8 | 7 | 7 | 7 | 6 | 7 |
| 4 | EVEN | 7 | 7 | 6 | 7 | 6 | 6 |
| 3 | ODD | 7 | 7 | 6 | 7 | 6 | 6 |
| 3 | EVEN | 7 | 6 | 6 | 6 | 5 | 6 |
| 2 | ODD | 7 | 6 | 6 | 6 | 5 | 6 |
| 2 | EVEN | 6 | 6 | 5 | 6 | 5 | 5 |
| 1 | ODD | 6 | 6 | 5 | 6 | 5 | 5 |
| 1 | EVEN | 6 | 5 | 5 | 5 | 4 | 5 |
| 0 | ODD | 6 | 5 | 5 | 5 | 4 | 5 |
| 0 | EVEN | 5 | 5 | 4 | 5 | 4 | 4 |
| -1 | ODD | 5 | 5 | 4 | 5 | 4 | 4 |
| -1 | EVEN | 5 | 4 | 4 | 4 | 3 | 4 |
| -2 | ODD | 5 | 4 | 4 | 4 | 3 | 4 |
| -2 | EVEN | 4 | 4 | 3 | 4 | 3 | 3 |
| -3 | ODD | 4 | 4 | 3 | 4 | 3 | 3 |
| -3 | EVEN | 4 | 3 | 3 | 3 | 2 | 3 |
| -4 | ODD | 4 | 3 | 3 | 3 | 2 | 3 |
| -4 | EVEN | 3 | 3 | 2 | 3 | 2 | 2 |
| -5 | ODD | 3 | 3 | 2 | 3 | 2 | 2 |
| -5 | EVEN | 3 | 2 | 2 | 2 | 1 | 2 |
| -6 | ODD | 3 | 2 | 2 | 2 | 1 | 2 |
| -6 | EVEN | 2 | 2 | 1 | 2 | 1 | 1 |

FIG. 10b

| Vy | VXP | PV | | | | | |
|---|---|---|---|---|---|---|---|
| | | P | Q | R | S | T | U |
| 6 | ODD | 2 | 3 | 2 | 1 | 1 | X |
| 6 | EVEN | 2 | 3 | 2 | 1 | 1 | X |
| 5 | ODD | 2 | 3 | 2 | 1 | 1 | X |
| 5 | EVEN | 3 | 4 | 3 | 2 | 2 | 1 |
| 4 | ODD | 3 | 4 | 3 | 2 | 2 | 1 |
| 4 | EVEN | 3 | 4 | 3 | 2 | 2 | 1 |
| 3 | ODD | 4 | 5 | 3 | 3 | 3 | 2 |
| 3 | EVEN | 3 | 4 | 3 | 2 | 2 | 1 |
| 2 | ODD | 4 | 5 | 4 | 3 | 3 | 2 |
| 2 | EVEN | 4 | 5 | 4 | 3 | 3 | 2 |
| 1 | ODD | 4 | 5 | 4 | 3 | 3 | 2 |
| 1 | EVEN | 5 | 6 | 5 | 4 | 4 | 3 |
| 0 | ODD | 5 | 6 | 5 | 4 | 4 | 3 |
| 0 | EVEN | 5 | 6 | 5 | 4 | 4 | 3 |
| -1 | ODD | 6 | 7 | 6 | 5 | 5 | 4 |
| -1 | EVEN | 5 | 6 | 5 | 4 | 4 | 3 |
| -2 | ODD | 6 | 7 | 6 | 5 | 5 | 4 |
| -2 | EVEN | 6 | 7 | 6 | 5 | 5 | 4 |
| -3 | ODD | 6 | 7 | 6 | 5 | 5 | 4 |
| -3 | EVEN | 7 | 8 | 7 | 6 | 6 | 5 |
| -4 | ODD | 7 | 8 | 7 | 6 | 6 | 5 |
| -4 | EVEN | 7 | 8 | 7 | 6 | 6 | 5 |
| -5 | ODD | 8 | X | 8 | 7 | 7 | 6 |
| -5 | EVEN | 7 | 8 | 7 | 6 | 6 | 5 |
| -6 | ODD | 8 | X | 8 | 7 | 7 | 6 |
| -6 | EVEN | 8 | X | 8 | 7 | 7 | 6 |

FIG. 11a

| Vx | SP | PH | | | | | |
|---|---|---|---|---|---|---|---|
| | | P | Q | R | S | T | U |
| 6 | ODD | 9 | 8 | 8 | 8 | 7 | 8 |
| 6 | EVEN | 8 | 8 | 7 | 8 | 7 | 7 |
| 5 | ODD | 8 | 8 | 7 | 8 | 7 | 7 |
| 5 | EVEN | 8 | 7 | 7 | 7 | 6 | 7 |
| 4 | ODD | 8 | 7 | 7 | 7 | 6 | 7 |
| 4 | EVEN | 7 | 7 | 6 | 7 | 6 | 6 |
| 3 | ODD | 7 | 7 | 6 | 7 | 6 | 6 |
| 3 | EVEN | 7 | 6 | 6 | 6 | 5 | 6 |
| 2 | ODD | 7 | 6 | 6 | 6 | 5 | 6 |
| 2 | EVEN | 6 | 6 | 5 | 6 | 5 | 5 |
| 1 | ODD | 6 | 6 | 5 | 6 | 5 | 5 |
| 1 | EVEN | 6 | 5 | 5 | 5 | 4 | 5 |
| 0 | ODD | 6 | 5 | 5 | 5 | 4 | 5 |
| 0 | EVEN | 5 | 5 | 4 | 5 | 4 | 4 |
| -1 | ODD | 5 | 5 | 4 | 5 | 4 | 4 |
| -1 | EVEN | 5 | 4 | 4 | 4 | 3 | 4 |
| -2 | ODD | 5 | 4 | 4 | 4 | 3 | 4 |
| -2 | EVEN | 4 | 4 | 3 | 4 | 3 | 3 |
| -3 | ODD | 4 | 4 | 3 | 4 | 3 | 3 |
| -3 | EVEN | 4 | 3 | 3 | 3 | 2 | 3 |
| -4 | ODD | 4 | 3 | 3 | 3 | 2 | 3 |
| -4 | EVEN | 3 | 3 | 2 | 3 | 2 | 2 |
| -5 | ODD | 3 | 3 | 2 | 3 | 2 | 2 |
| -5 | EVEN | 3 | 2 | 2 | 2 | 1 | 2 |
| -6 | ODD | 3 | 2 | 2 | 2 | 1 | 2 |
| -6 | EVEN | 2 | 2 | 1 | 2 | 1 | 1 |

FIG. 11b

METHOD AND APPARATUS FOR MOTION COMPENSATED INTERPOLATION

The present invention relates to a method and to an apparatus for motion compensated interpolation.

BACKGROUND

For motion compensated interpolation (MCI) with sub-pixel accuracy the missing pixels need to be generated or interpolated prior to the motion compensation. For the Barcelona Olympic Games THOMSON HDMAC receivers have been built. Such receivers fulfil the preliminary HDMAC specification of the BRD (bandwidth restoration decoder) chip set for the Olympic Receiver Project/Version 2.1, Philips. The required pixel values are stored using line and pixel delays. A switch matrix selects such stored pixels which are currently needed for the processing. In order to avoid sub-pixel MCI, the interpolation is carried out prior to the motion compensation. Thus, the input data rate of the motion compensation circuitry is twice then that of the interpolation circuitry. The resulting hardware complexity is high. Sub-pixel interpolation does mean interpolation of pixels located between available samples.

INVENTION

It is one object of the invention to disclose a method of combined motion compensation and interpolation having a sub-pixel precision, but using only a limited number of pixels accessed by the switch matrix. This object is reached by the method disclosed in claim 1.

It is a further object of the invention to disclose an apparatus which utilises the inventive method. This object is reached by the apparatus disclosed in claim 8.

The invention leads to a reduced amount of stored data for performing a sub-pixel MCI using a simple switch matrix, only. A special arrangement of delays storing pixel values needed for the processing is used to extend the existing delay array. Because an increased number of pixels involved is used, an improved sub-pixel MCI is achieved. This is possible due to the fact that such delay extension does not affect significantly the decoded picture quality even if adjacent motion vectors do not match exactly to the current motion vector. The invention can be used in every system making use of MCI, especially in decoders of coding systems based on spatio-temporal subsampling and motion compensation. Motion compensation and interpolation are achieved simultaneously at the clock frequency of the input data stream. Therefore, the amount of data to process and the resulting hardware complexity are lower than in the cited prior art. The switch matrix is connected to line and pixel delays storing a window of a frame (or field) at time t from which a MCI is achieved to build a frame (or field) at time (t+/−T) by random access depending on motion vectors. T is a multiple of the frame (field) period. The number of pixels extracted by the switch matrix at each clock period is limited by hardware complexity constraints. The invention is based on the hypothesis that two consecutive sets of switch matrix outputs are juxtaposed or intersected. So, several consecutive sets of switch matrix outputs can be stored in order to carry out an interpolation using all available pixels. The hypothesis has been validated by investigating the behaviour on very critical source materials. The invention can be used in every system using motion compensation. Especially, it is suited to coding/decoding systems based on spatio-temporal subsampling and motion compensation like HDMAC.

In HDMAC this technique can be performed directly on sub-sampled fields. For each current pair of pixels (denoted 80-1 and 80-2) to be interpolated six samples come out of the switch matrix. In fact, only four samples are dedicated to the interpolation of one of these pixels, but two samples of the 2*4 samples are common. Therefore, only six switch matrix outputs are required. Due to the inventive delay extension at the output of the switch matrix the interpolation filter can use an input window of ten pixels for calculating an output pixel value (80_1 or 80_2). The vertical dimension of the interpolation filter is given by the number of different lines accessed by the switch matrix, e.g. three. The horizontal dimension is not limited by the switch matrix but depends only on the number of switch matrix output sets which are stored. In the prior art the interpolation filter has a spread of pixels greater than the spread of pixels given by the switch matrix outputs. So the interpolation needs to be carried out prior to the switch matrix in order to reach the required accuracy. But this way of hardware implementation doubles the sample rate at the input of the switch matrix and requires a data de-multiplexing to maintain the input frequency of the interpolator. The combination of interpolation and motion compensation maintains a low input frequency for the processing and optimises the required number of line delays which are very hardware consuming. This number is determined only by the range of motion compensation in vertical direction. Advantageously, the invention can also be applied to every system which uses motion compensated interpolation for display rate upconversion.

The MPEG (motion pictures expert group) codec system uses motion compensation with motion vectors at half pixel accuracy. Consequently, sub-pixel motion compensated interpolation is required on an orthogonal grid (quincunx grid in HDMAC). As the way of achieving motion compensated interpolation is part of the MPEG standard none approximation at block border is allowed, because the encoded prediction error of a block is added to the motion compensation.

In principle, in the inventive method of motion compensated interpolation the output pixel values are interpolated from input pixel values located within a window which is related to the spatial and/or temporal location of the current output pixel, wherein the pixel values required for said window are made available using delay means and switch matrix means, the outputs of which are currently connected in response to a motion vector to such of said delay means which currently deliver said input pixel values, and wherein each of the outputs of said switch matrix means pass through at minimum one further delay unit and said outputs of the switch matrix means and the outputs of said delay units are used to form an increased window for interpolating said output pixel values.

Advantageous additional embodiments of the inventive method are resulting from the respective dependent claims.

In principle the inventive apparatus is suited for motion compensated interpolation, wherein the output pixel values are interpolated from input pixel values located within a window which is related to the spatial and/or temporal location of the current output pixel and comprises:
  delay means which make available the pixel values required for said window;
  switch matrix means, the outputs of which are currently connected in response to a motion vector to such of said delay means which currently deliver said input pixel values;
  at minimum one delay unit at each switch matrix means output through which each of the outputs of the switch matrix means passes, wherein said outputs of the switch matrix means and the outputs of said delay units are used to form an increased window;

interpolating means subsequent to said delay units for interpolating said output pixel values.

Advantageous additional embodiments of the inventive apparatus are resulting from the respective dependent claims.

DRAWINGS

Figure 3:
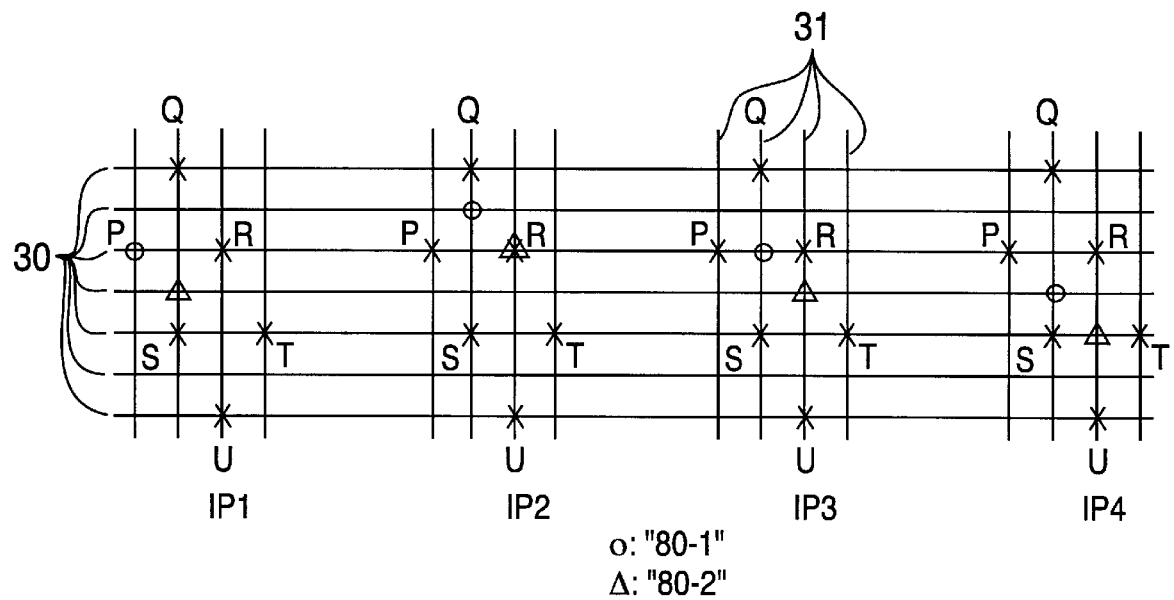
Figure 12:
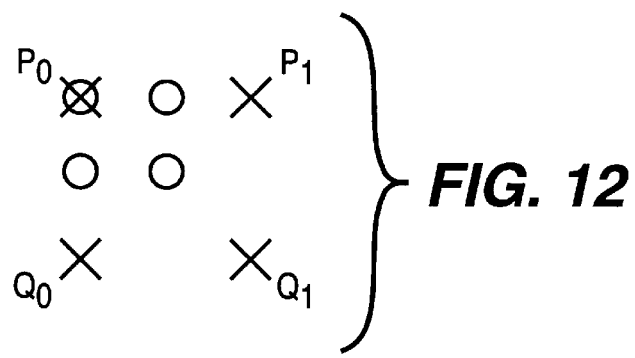
Figure 5:
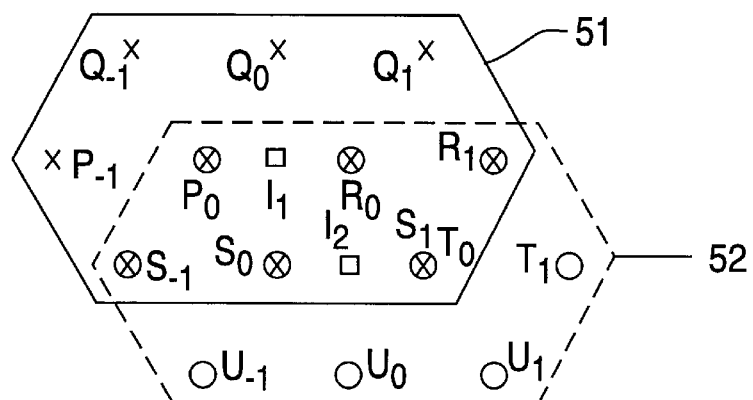
Figure 6:
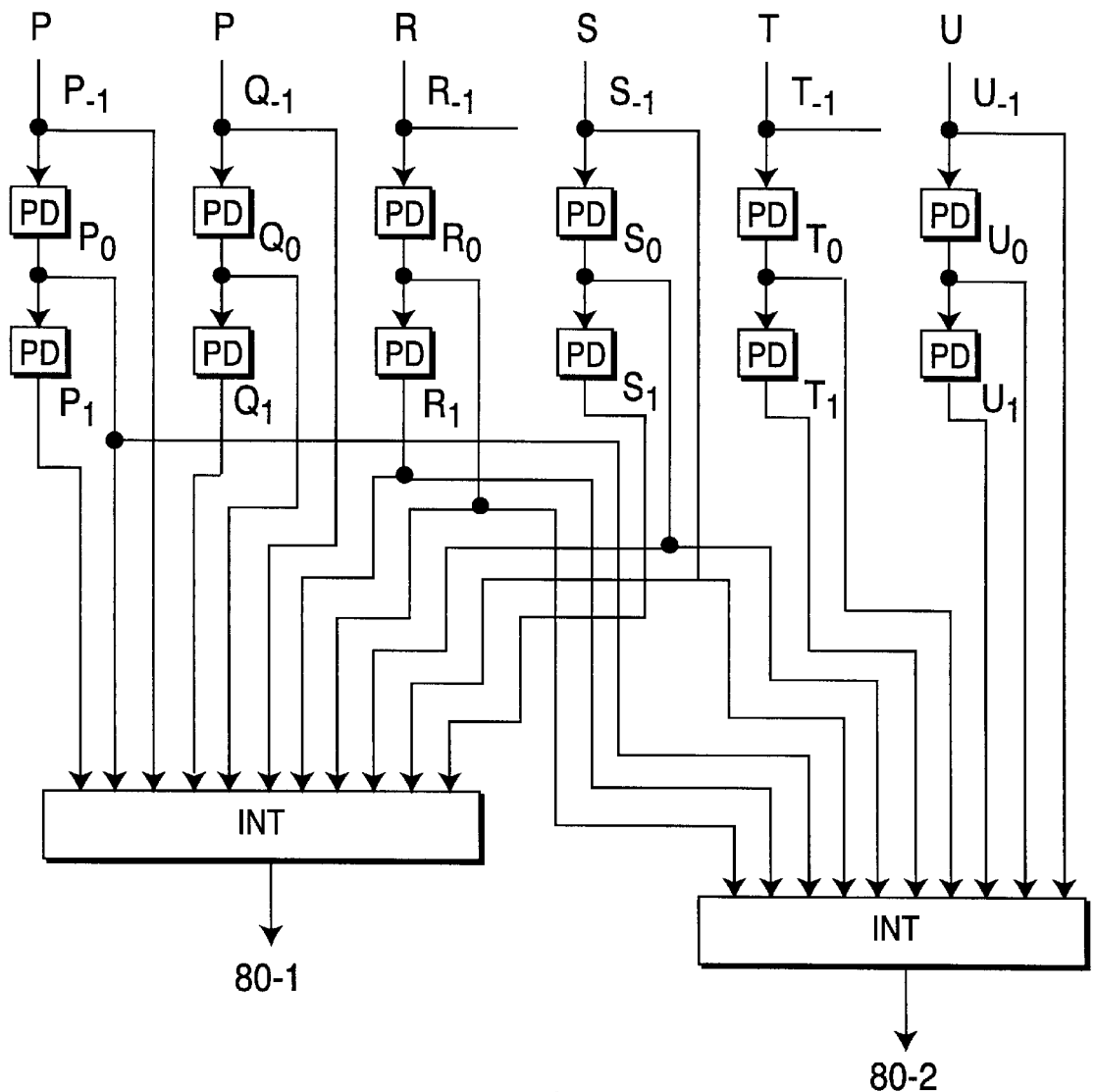
Figure 7:
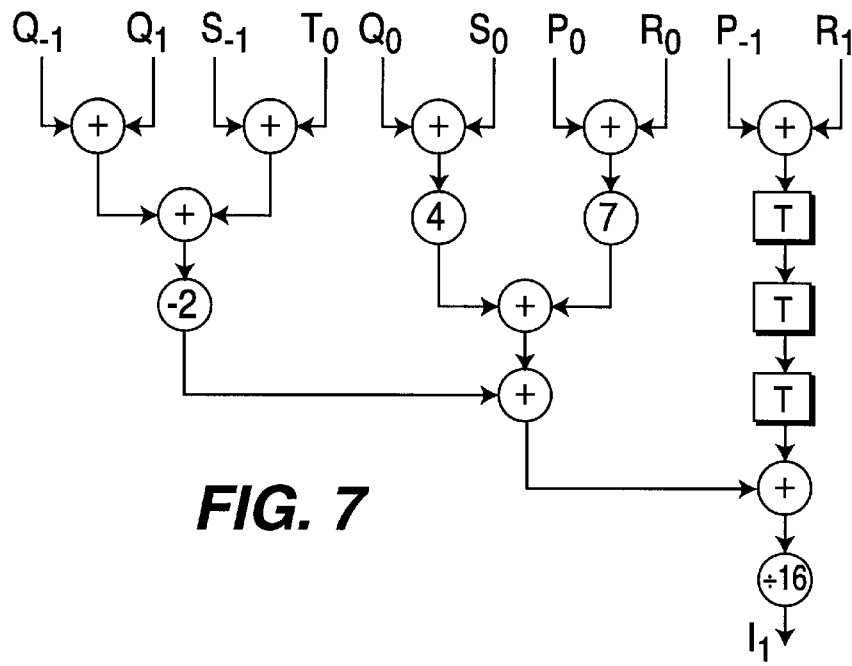

Preferred embodiments of the invention are described with reference to the accompanying drawings, which show in:

FIG. 1 block diagram of the inventive MCI;

FIG. 2 pixels used in the MCI;

FIG. 3 possible locations of motion vector displaced pixels within a quincunx sampling grid;

FIG. 4 horizontal and vertical delays in more detail;

FIG. 5 interpolation windows;

FIG. 6 interpolation scheme using the inventive delay arrangement;

FIG. 7 interpolation circuit;

FIG. 8 position of the interpolation windows within the sampling grid;

FIG. 9 windows at the input of the switch matrices;

FIG. 10 vertical position limitation tables for field 40_A;

FIG. 11 vertical position limitation tables for field 40_C;

FIG. 12 possible locations of motion vector displaced pixels within an orthogonal sampling grid.

PREFERRED EMBODIMENTS

In the HDMAC HDTV system the luminance and chrominance pixels are processed on a block basis. Different processing modes are assigned to the block types depending on the amount of motion within the picture content of a block:

| mode  | motion speed         |
|-------|----------------------|
| 80 ms | static or near static |
| 40 ms | medium               |
| 20 ms | rapid                |

Data reduction is achieved by spatial and temporal subsampling and motion compensation. To each mode a specific subsampling pattern is assigned. In the 40 ms mode for each second field motion compensation is used. Since the 40 ms mode is statistically the most used in the HDMAC coding algorithm it is very important to achieve a proper 40 ms processing in the BRD. Without taking into account a compatibility improvement circuitry, the 40 ms processing begins in a SSPC circuitry (Sub Sampling Pattern Conversion) which converts all the transmitted picture information (e.g. sub-sampled pixel values) into the 40 ms sub sampling pattern. Due to a related reduction of the number of occupied field memories from five to three, some temporal commutations between the 40 ms and the 80 ms mode are not properly processed. This has a great influence on the motion compensated field because the motion compensation is symmetrical and can look into blocks which are not transmitted in the 40 ms mode. Then the 40 ms processing itself is carried out using interpolation in the odd fields and using motion compensation in the even fields.

An advantageous simplification concerns the output pattern of the 40 ms branch. In the known BRD the hardware cost was increased significantly by circuits which did no processing except compensating delays between the mode branches. In particular, this is true for compensation delays introduced subsequent to the 40 ms branch while the 80 ms processing was achieved. In order to suppress these compensation delays the 40 ms branch output corresponds to the 80 ms pattern and allows the 40 ms blocks to be processed by an 80 ms interpolator.

A further simplification according to the invention is related to the motion compensation processing. In the known BRD, motion compensation was achieved after interpolating the two surrounding odd fields. The output were full definition fields. Now, the motion compensation is performed on the 40 ms quincunx grid and the output are the two 80 ms mode patterns 80_1 and 80_2. The previous 40 ms branch was composed of six circuits: two interpolators and four motion compensated delays. Now there are two motion compensated interpolators, only. The hardware complexity of these circuits mainly results from the required switch matrix. This switch matrix is composed of line delays and pixel delays which permit a random access to motion vector displaced pixels.

In the known switch matrix, nine line delays were used for access to four pixels, in the new one only seven line delays are needed for access to six pixels. In FIG. 1 two motion compensated interpolators 11 and 12 receive 40 ms blocks 40_A and 40_C of the first and of the third field of each two consecutive frames. A set of horizontal and vertical delays DHV is followed by a switch matrix SM. The six output pixel values P, Q, R, S, T and U of each switch matrix SM pass through a further array of horizontal delays DH. To get all pixel values for the 80 ms output grid these delays are followed by interpolators INT. For the interpolation the four nearest pixels P, Q, R and S of a single motion vector displaced output pixel are required. The two corresponding sets of four pixels have at least two common pixels because of the spatial location of the 80_1 and 80_2 outputs. This means that by using the same window the access to six pixels P, Q, R, S, T and U is sufficient for motion compensating the 80_1 and 80_2 outputs. The calculated output values 80_1 and 80_2 of the 40 ms branch are combined in a multiplexer MUX which delivers at each 27 MHz clock cycle the final output values 80_1 of the odd field in the 80 ms mode pattern and 80_2 of the even field in the 80 ms mode pattern.

In FIG. 3, the four possible line 30 and column 31 locations IP1, IP2, IP3 and IP4 of motion vector displaced pixels within the 80 ms grid are depicted to illustrate the six required interpolation inputs P, Q, R, S, T and U. Circles ○ mark the spatial location of the 80_1 output values and triangles △ the spatial location of the 80_2 output values.

Figure 2A:
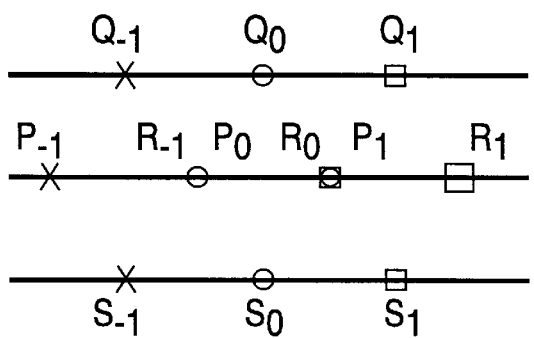
Figure 2B:
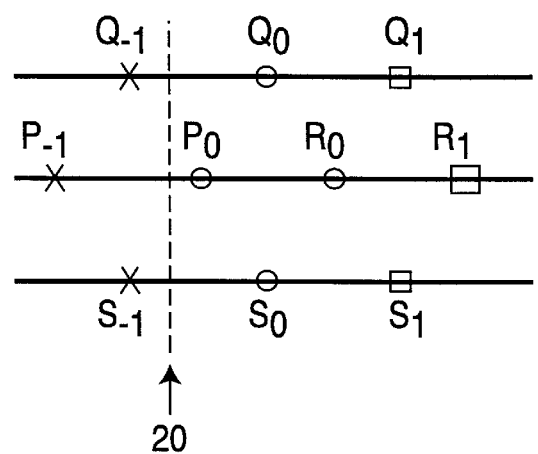
Figure 4A:
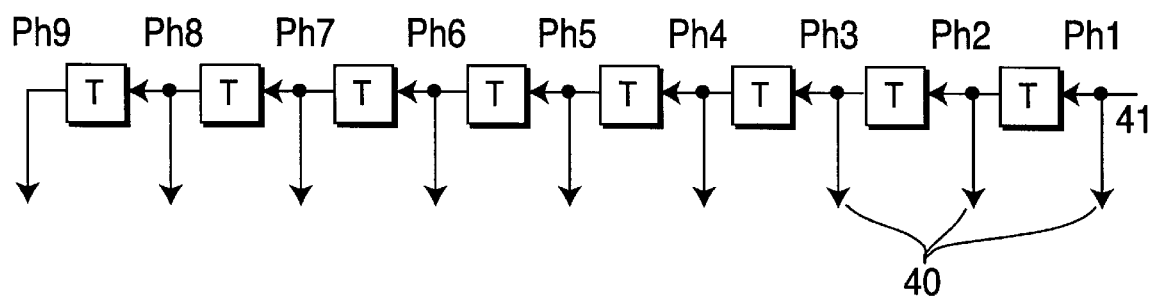
Figure 4B:
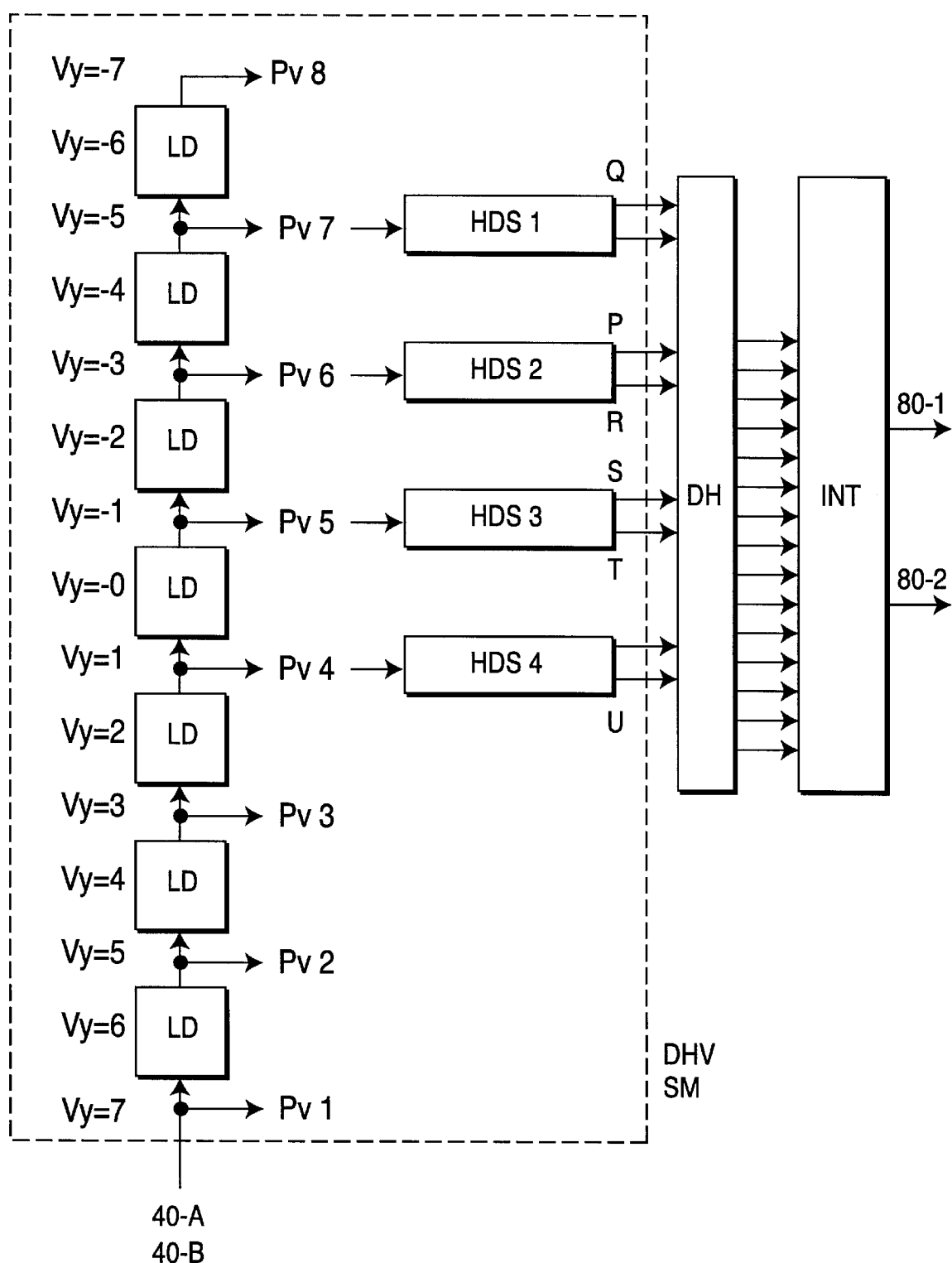

As explained before, the motion compensation on the quincunx grid needs an interpolation when a motion vector displaced pixel is not on the quincunx grid. In this case it is difficult to have a correct interpolated pixel when using only the four nearest pixels P, Q, R and S. This problem is overcome by memorising in the horizontal delays DH three consecutive switch matrix outputs. As depicted in FIG. 2a, twelve pixels having ten different spatial locations Q-1, Q0, Q1, P-1, R-1/P0, R0/P1, R1, S-1, S0 and S1 are available for the interpolation of the output pixel values 80_1 and 80_2 in the interpolators INT, if the same vector is used to access them. As shown in FIG. 2b, at block border 20 some problems can occur when the motion vector of the adjacent block is different. In this case, seven pixels Q0, Q1, P0, R0, R1, S0 and S1 out of the ten used in the interpolators INT give correct input values. In order to avoid complex controls at the block borders, two assumptions are made. These assumptions have been carefully investigated over picture sequences offering very busy motion areas. The investigations proofed that such assumptions can be allowed. The first assumption is that an interpolation using seven correct pixels, especially the four nearest pixels, out of the ten contained in the interpolation window shown in FIG. 5 will not give a noticeable error, but, maybe in some particular picture content, a blurred pixel, only. The second assumption concerns the continuity existing in every motion vector field obtained by a block based motion estimator, which would validate the use of three pixels outside the current block. When discontinuity appears in a motion vector field the HDMAC encoder usually chooses the 20 ms mode. If the motion compensation does not give a good result, then the first assumption should work because a zero vector is applied to 20 ms blocks FIG. 4b shows the set of horizontal and vertical delays DHV in more detail. The input values 40_A and 40_B, respectively, pass through a chain of seven line delays LD which make available in parallel the pixels of eight lines of the current field at the outputs Pv1 to Pv8. These outputs correspond to the vertical vector positions Vy=7, Vy=5, Vy=3, . . . , Vy=−7. The outputs Pv1 to Pv8 are fed to the inputs 41 of horizontal delay sections HDS having the outputs 40 (Ph1 to Ph9) and which are shown in FIG. 4a in more detail. Each block T is a pixel delay. Four of the horizontal delay sections (HDS1, HDS2, HDS3, HDS4) are depicted in FIG. 4b indicating that a subsequent switch matrix SM connects for each current pixel position such of the outputs 40 to the respective six switch matrix outputs which represent the pixels P, Q, R, S, T and U.

FIG. 5 shows the 80_1 interpolation window 51 for the current pixel I1 and the 80_2 interpolation window 52 for the current pixel I2.

In FIG. 6 each of the six input pixel values P, Q, R, S, T and U passes through a chain of two pixel delays PD, the inputs and outputs, respectively, of which are connected in such a way to the interpolators INT that the pixels of the interpolation windows 51 and 52 are used.

FIG. 7 represents a possible hardware implementation of an interpolator INT. The input pixel values Q-1, Q1, S-1, T0, Q0, S0, P0, R0, P-1 and R1 resulting from interpolation window 51 are combined using adders "+", multipliers "−2", "4", "7", delays T and a divider or shifter "÷16".

It is worth noting that the six switch matrix outputs of the current 40 ms branch output are always used in the 80_1 window 51 because they are correct even at the right border of a block:

current set=(P0, Q0, R0, S0, T0, U0)

Figure 8A:
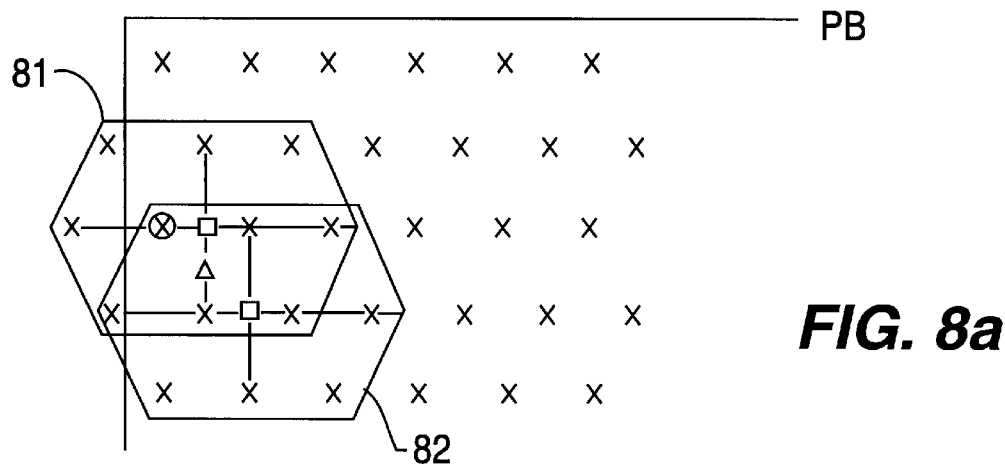
Figure 8B:
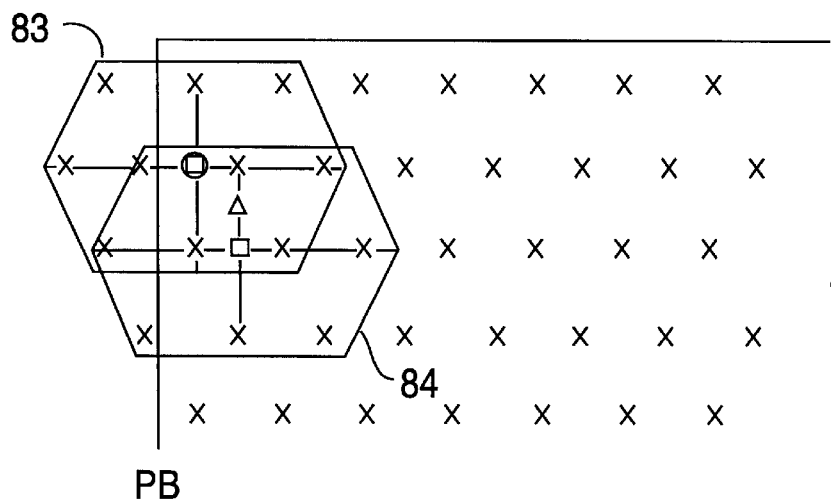

But for hardware simplification reasons T0 is not used in the interpolation of I1 and P0 is not used in the interpolation of I2. FIG. 8 shows precisely the window positions in case the current line is odd (FIG. 8a) or even (FIG. 8b). PB is the picture border, 81 and 83 are 80_1 windows and 82 and 84 are 80_2 windows. The marks have the following meaning:

X transmitted pixel (40 ms)

☐ centre of window

○ sample 80_1

△ sample 80_2

I1 and I2 can be calculated according to the following formulas:

$$I_1 = \frac{[-2(Q_{-1} + Q_1 + S_{-1} + S_1) + 4(Q_0 + S_0) + 7(P_0 + R_0) + (P_{-1} + R_1)]}{16}$$

$$I_2 = \frac{[-2(R_{-1} + R_1 + U_{-1} + U_1) + 4(R_0 + U_0) + 7(S_0 + T_0) + (S_{-1} + T_1)]}{16}$$

Odd field processing:

No motion compensation is applied on odd fields, but the switch matrix SM works with a zero vector to allow processing through a motion compensated interpolator (MCI) in the HDMAC BRD. Only the MCI with a 40_A input is active. The spatial location of the windows in FIG. 8a and FIG. 8b depends on the output line parity within the field.

Oddline:

$$80\_1 = P_0$$

$$80\_2 = \frac{I_1 + S_0}{2}$$

Even line:

$$80\_1 = I_1$$

$$80\_2 = \frac{I_2 + R_0}{2}$$

Even field processing:

The impact point IP is the motion vector displaced pixel within the set of six pixels (see FIG. 3) which are outputs of the switch matrix SM. In fact the impact point characterises the position of a couple of points 80_1 and 80_2. The motion vector (Vx, Vy) and the current line parity determine the impact point location. The current line parity is referred to an odd field since the interlace doesn't exist anymore for an 80 ms output pattern.

Odd line:

The impact point IP is known from the following formula:

$$S = |V_x| + \frac{|V_y|}{2}$$

|Vx| stands for absolute value of Vx. As Vx and Vy are integers, S can be an integer or not:

$$S \text{ integer} \begin{cases} \text{If } S \text{ is even } IP = IP1 \\ \text{If } S \text{ is odd } IP = IP3 \end{cases}$$

$$S \text{ not integer and } V_y \text{ negative} \begin{cases} \text{If } I(S) \text{ is even } IP = IP2 \\ \text{If } I(S) \text{ is odd } IP = IP4 \end{cases}$$

$$S \text{ not integer and } V_y \text{ positive} \begin{cases} \text{If } I(S) \text{ is even } IP = IP4 \\ \text{If } I(S) \text{ is odd } IP = IP2 \end{cases}$$

I(S) stands for integer part of S

Even line:

The impact point IP is known from the following formula:

$$S = |V_x| + \frac{|V_y|}{2}$$

S calculation is the same as for odd lines, but the IP assignment is different:

$$S \text{ integer} \begin{cases} \text{If } S \text{ is even } IP = IP3 \\ \text{If } S \text{ is odd } IP = IP1 \end{cases}$$

$$S \text{ not integer and } V_y \text{ negative} \begin{cases} \text{If } I(S) \text{ is even } IP = IP4 \\ \text{If } I(S) \text{ is odd } IP = IP2 \end{cases}$$

$$S \text{ not integer and } V_y \text{ positive} \begin{cases} \text{If } I(S) \text{ is even } IP = IP2 \\ \text{If } I(S) \text{ is odd } IP = IP4 \end{cases}$$

The interpolation to be achieved depends on the impact point:

$$IP1 \begin{cases} 80\_1 = P_0 \\ 80\_2 = \dfrac{I_1 + S_0}{2} \end{cases}$$

$$IP2 \begin{cases} 80\_1 = \dfrac{I_1 + Q_0}{2} \\ 80\_2 = R_0 \end{cases}$$

$$IP3 \begin{cases} 80\_1 = I_1 \\ 80\_2 = \dfrac{I_2 + R_0}{2} \end{cases}$$

$$IP4 \begin{cases} 80\_1 = \dfrac{I_1 + S_0}{2} \\ 80\_2 = I_2 \end{cases}$$

For an extremely negative vertical vector component $V_y = -6$ and $V_y = -5$ pixel U is not always available as well as for an extremely positive vertical vector component $V_y = +6$ and $V_y = +5$ V. FIG. 10 and FIG. 11 define these cases. Thus, the interpolation needs to be simplified:

$$\text{When } U \text{ is absent, then } I_2 = \dfrac{(3S_0 + 3T_0 + 2R_0)}{8}$$

$$\text{When } Q \text{ is absent, then } I_1 = \dfrac{(3P_0 + 3R_0 + 2S_0)}{8}$$

The outputs of switch matrix SM depend on the motion vector (zero vector for odd field) and on the line parity (always referred to an odd field). The FIG. 9 illustrates the accessible pixels for an odd line (FIG. 9*a*, Pv=5) and an even line (FIG. 9*b*, Pv=5). The mark @ represents an 80_1 position and the mark ○ an 80_2 position. In order to reduce the necessary number of line delays, not all pixels needed for the interpolation are available in any case for extreme large vertical vector components. FIG. 10 and FIG. 11 give the coordinates of the switch matrix outputs according to the numbering of FIG. 9 and field 40_A (t−20 ms). A horizontal vector component is positive for a horizontal displacement from the left to the right of the picture. A vertical vector component is positive for a vertical displacement from the bottom to the top of the picture. To have the tables referred to field 40_C (t+20 ms) the sign of the vertical components needs to be inverted. FIG. 10*a* defines for odd lines the vertical position PV with respect to Vy and to the Vx parity VXP. FIG. 10*b* defines for odd lines the horizontal position PH with respect to Vx and to the S parity SP. S parity for odd line:

$$S = |V_x| + \dfrac{|V_y|}{2}.$$

If S is even, then S parity is even. If S is not even, then S parity is odd.

FIG. 11*a* defines for even lines the vertical position PV with respect to Vy and to the Vx parity VXP.

FIG. 11*b* defines for even lines the horizontal position PH with respect to Vx and to the S parity SP. S parity for even line:

$$S = |V_x| + \dfrac{|V_y| + 2}{2}.$$

If S is even, then S parity is even. If S is not even, then S parity is odd.

In an orthogonal sampling grid system, e.g. MPEG, the motion compensated interpolation is bi-linear (i.e. linear in the two spatial directions) by using the four nearest pixels P0, Q0, P1, Q1 surrounding the possible motion vector impact point. The impact point can have four different locations ○ within the sampling grid as depicted in FIG. 12. Therefore, a switch matrix SM must access the four pixels P0, Q0, P1, Q1. According to the invention, the quantity of pixels to be accessed for each output pixel location of a motion compensated block can be reduced to 2 (P and Q). Due to the delays PD (similar as depicted in FIG. 6) all four required input pixel values are available for a correct interpolation. The block border problem can be solved by extending the processing of the motion compensation by one pixel per block line. For example, if a vector should be applied to a 16*16 block, the switch matrix SM needs to access 2 pixels (P and Q) only at each pixel position of a 17*16 block. So the four pixels used in the motion compensation everywhere in the 16*16 block are accessed with the same vector and the motion compensated block can be reconstructed perfectly even at block border.

The invention can be used e.g. in TV sets and digital VCR's.

What is claimed is:

1. Method for the interpolation of a digital video signal, comprising the steps of:
    delaying pixel values of said digital video signal required for a spatial interpolation window in order to provide input pixel values which are required for an interpolation of output pixel values;
    additionally delaying pixel values belonging to said spatial interpolation window, wherein said provided input pixel values and the additionally delayed pixel values form an enlarged interpolation window, and
    interpolating an output pixel with sub-pixel resolution from pixel values gotten from said enlarged interpolation window, wherein the spatial position of said spatial interpolation window is related to the spatial location of the current output pixel to be interpolated.

2. Method according to claim 1, wherein said motion compensated interpolation is used for display rate upconversion.

3. Method according to claim 1, wherein said interpolation is performed in an HDMAC decoder, wherein a switch matrix works with a zero vector in odd fields.

4. Method according to claim 1, wherein said interpolation is modified in the case of a high vertical vector component.

5. Method according to claim 1, wherein said output pixels form a sample grid compared to which said input pixels are sub-sampled pixels.

6. Method according to claim 1, wherein two or more of said output pixel values are interpolated in parallel, wherein for each of these output pixels a different set of input pixel values is required, but a part of these sets is composed of common input pixel values.

7. Method according to claim 1, wherein said interpolation is performed on a field basis.

8. Apparatus for the interpolation of a digital video signal, comprising:

- delay means for delaying pixel values of said digital video signal required for a spatial interpolation window
- switch matrix means which provide pixel values required for interpolation to means for interpolating input pixel values, wherein outputs of said switch matrix means each pass through at least one additional pixel delay unit and wherein said provided pixel values and the additionally delayed pixel values form an enlarged interpolation window;
- means for interpolating an output pixel with sub-pixel resolution from pixel values out of said enlarged interpolation window, wherein the spatial position of said spatial interpolation window is related to the spatial location of the current output pixel to be interpolated.

9. Apparatus according to claim 8, wherein said apparatus is part of a TV receiver of one of an HDMAC or MPEG receiver, an HDMAC or MPEG decoder, or a digital VCR.

* * * * *